US012231179B2

(12) United States Patent
Hui et al.

(10) Patent No.: US 12,231,179 B2
(45) Date of Patent: Feb. 18, 2025

(54) METHOD FOR CORRECTING ANTENNAS IN CELL, ELECTRONIC DEVICE, AND STORAGE MEDIUM

(71) Applicant: ZTE Corporation, Shenzhen (CN)

(72) Inventors: Yan Hui, Shenzhen (CN); Jianguang Zhou, Shenzhen (CN); Rongmao Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/029,035

(22) PCT Filed: Dec. 14, 2021

(86) PCT No.: PCT/CN2021/137901
§ 371 (c)(1),
(2) Date: Mar. 28, 2023

(87) PCT Pub. No.: WO2022/135225
PCT Pub. Date: Jun. 30, 2022

(65) Prior Publication Data
US 2023/0370178 A1 Nov. 16, 2023

(30) Foreign Application Priority Data

Dec. 21, 2020 (CN) .......................... 202011519600.0

(51) Int. Cl.
*H04B 17/21* (2015.01)
*H04B 7/024* (2017.01)
*H04B 17/12* (2015.01)

(52) U.S. Cl.
CPC ............. *H04B 17/21* (2015.01); *H04B 7/024* (2013.01); *H04B 17/12* (2015.01)

(58) Field of Classification Search
CPC ........ H04B 17/21; H04B 7/024; H04B 17/12; H04W 24/02
See application file for complete search history.

(56) References Cited

U.S. PATENT DOCUMENTS 9,661,511 B2 5/2017 Yi
2010/0117890 A1* 5/2010 Vook ...................... H04B 17/21
342/174

(Continued)

FOREIGN PATENT DOCUMENTS

CN 101753185 A 6/2010
CN 102315866 A 1/2012
(Continued)

OTHER PUBLICATIONS

Machine translation of CN-112311481-A (Year: 2021).*
(Continued)

*Primary Examiner* — Jean B Corrielus
(74) *Attorney, Agent, or Firm* — Wolf, Greenfield & Sacks, P.C.

(57) ABSTRACT

A method for correcting antennas in a cell, an electronic device, and a storage medium. A method for correcting antennas in a cell comprises: acquiring a joint correction group, the joint correction group being a set of cells to be corrected (101); receiving correction parameters reported by the cells to be corrected after transmitting correction sequences to each other at several different frequencies, and updating the correction parameters to a correction record table (102); according to the correction record table, selecting, from the joint correction group, a reference cell and a reference channel corresponding to the reference cell (103); acquiring a first parameter, in a transceiving process, reported by the reference channel and a non-reference channel after transmitting the correction sequence to each other, and calculating a first correction value of the non-reference channel according to the first parameter (104); and issuing the first correction value to the corresponding non-reference channel for correction of the non-reference channel (105).

19 Claims, 6 Drawing Sheets

(56) References Cited

U.S. PATENT DOCUMENTS

| | | |
|---|---|---|
| 2015/0085690 A1 | 3/2015 | Yi |
| 2015/0200740 A1 | 7/2015 | Yi et al. |
| 2018/0123666 A1 | 5/2018 | Chen et al. |
| 2020/0295851 A1 | 9/2020 | Luo et al. |
| 2020/0322068 A1 | 10/2020 | Jidhage et al. |

FOREIGN PATENT DOCUMENTS

| | | |
|---|---|---|
| CN | 102843173 A | 12/2012 |
| CN | 103457651 A | 12/2013 |
| CN | 104348769 A | 2/2015 |
| CN | 107395533 A | 11/2017 |
| CN | 109348533 A | 2/2019 |

OTHER PUBLICATIONS

International Search Report and Written Opinion for International Application No. PCT/CN2021/137901, mailed Mar. 14, 2022.
Examination Report for Indian Patent Application No. 202327026227, dated Mar. 26, 2024.
Partial European Search Report for European Application No. 21909221.0, dated Mar. 12, 2024.
Huang et al., Performance analysis of antenna calibration in coordinated multi-point transmission system. In2010 IEEE 71st Vehicular Technology Conference May 16, 2010; pp. 1-5.
Extended European Search Report for European Application No. 21909221.0, dated Jun. 4, 2024.
First Office Action for Chinese Application No. 202011519600.0 dated Sep. 27, 2024.
English Translation of the First Office Action for Chinese Application No. 202011519600.0 dated Sep. 27, 2024.

\* cited by examiner

METHOD FOR CORRECTING ANTENNAS IN CELL, ELECTRONIC DEVICE, AND STORAGE MEDIUM

CROSS-REFERENCE TO RELATED APPLICATION

This application is a national stage filing under 35 U.S.C. § 371 of international application number PCT/CN2021/137901, filed Dec. 14, 2021, which claims priority to Chinese patent application No. 202011519600.0, filed Dec. 21, 2020. The contents of these applications are incorporated herein by reference in their entirety.

TECHNICAL FIELD

The present disclosure relates to the field of antenna correction, in particular to a method for correcting a cell antenna, an electronic device, and a storage medium.

BACKGROUND

Distribute-MIMO multiple-input multiple-output system (D-MIMO) and Coordinated Multiple Points (COMP) are important techniques in the communication field. D-MIMO system includes several base stations and several Remote Radio Units (RRUs), and the scene is complex. COMP technique requires the same amplitude and phase. However, due to the non-ideal nature of the circuitry, and amplitude and phase inconsistencies between several RRU channels in a D-MIMO system, the antennas in the cell shall be subjected to correction to eliminate such inconsistencies, in order to implement the COMP technique. The essence of antenna correction is to reduce the relative error between channels through closed-loop feedback for antenna correction. Therefore, the traditional method for cell antenna correction is to first send data between the correction channel and the transmission and reception channel on the Remote Radio Unit (RRU). Then the base station compares the amplitude and phase of the received data measured by each channel and calculates the amplitude and phase difference between channels. Then the RRU compensates for the amplitude and phase according to the amplitude and phase difference to have several channels with consistent amplitude and phase.

However, RRUs are prone to interference and poor signal in the cell edge area, so only the antennas in one cell can be corrected each time, which is inefficient for a multi-cell scenario.

SUMMARY

Provided are a method for correcting a cell antenna, an electronic device, and a storage medium in some embodiments of the present disclosure.

An embodiment of the present disclosure provides a method for correcting a cell antenna, which may include, acquiring a joint correction group, where the joint correction group is a set of cells to be corrected; receiving correction parameters reported after mutual transmissions of correction sequences by the cells to be corrected, and updating the correction parameters to a correction record table; selecting a reference cell from the joint correction group, and selecting a reference channel corresponding to the reference cell, according to the correction record table; acquiring, a first parameter during transmission and reception of correction sequences, reported after mutual transmissions of the correction sequences between the reference channel and a non-reference channel, and calculating a first correction value of the non-reference channel according to the first parameter; and sending the first correction value to the corresponding non-reference channel for correction.

An embodiment of present disclosure further provides an electronic device, which may include, at least one processor; and a memory in communication with the at least one processor; where, the memory stores an instruction executable by the at least one processor which, when executed by the at least one processor, causes the at least one processor to carry out the method as described above.

An embodiment of the present disclosure further provides a computer-readable storage medium storing at least one computer program, which when executed by a processor, causes the processor to carry out the method as described above.

BRIEF DESCRIPTION OF DRAWINGS

One or more embodiments are illustrated in conjunction with the corresponding drawings, which do not constitute any limitation of the embodiments.

DETAILED DESCRIPTION

Various embodiments of the present disclosure will be described in detail below in conjunction with the drawings to illustrate the purpose, technical scheme and advantages of the present disclosure. However, it shall be appreciated by those having ordinary skills in the art that many technical details are put forward in order to clarify the present disclosure. However, the technical solutions claimed in the present disclosure can be practiced even without these technical details and various alternations and modifications based on the following embodiments. The following embodiments are divided for the convenience of description, and should not constitute any limitation on the implementation of the present disclosure. The embodiments can be combined with and based on each other without conflict.

Figure 1:
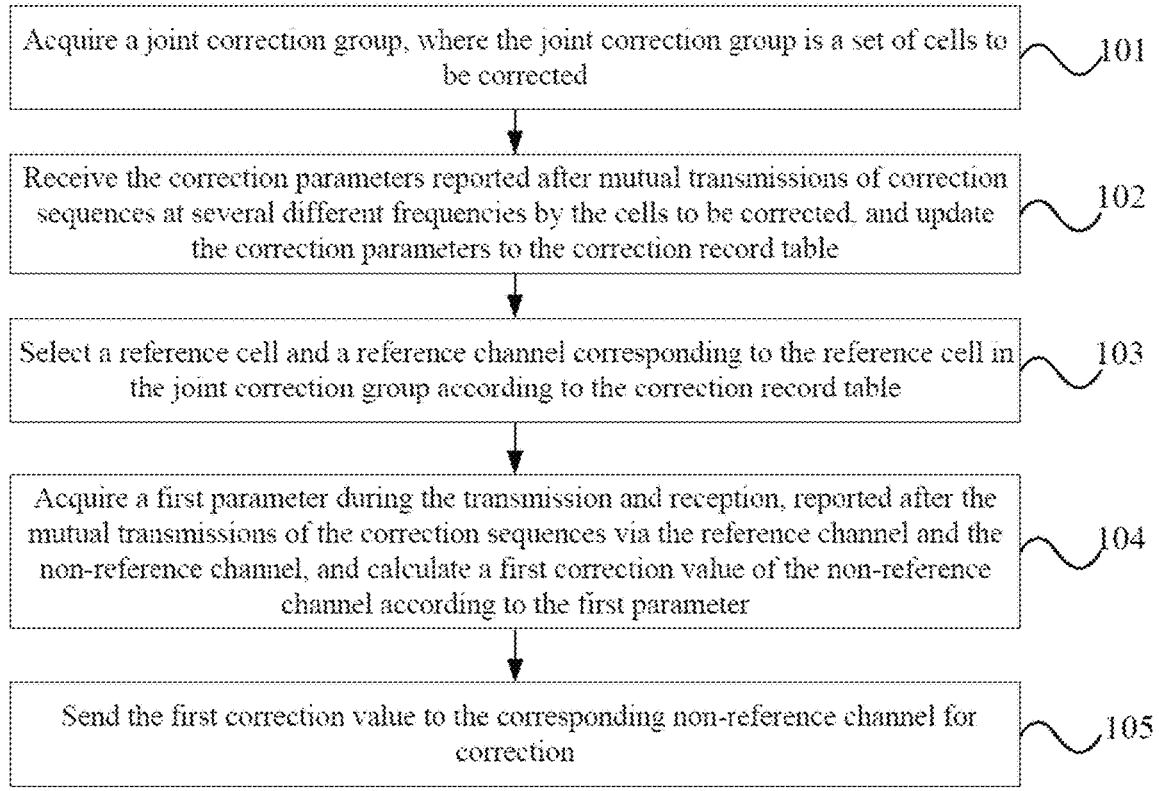
FIG. 1 depicts a flowchart showing a method for correcting a cell antenna according to embodiment one of the present disclosure.

Embodiment one of the present disclosure provides a method for correcting a cell antenna, which is applied to a base station. As shown in FIG. 1, the method includes the following operations.

S101, a joint correction group is acquired, where the joint correction group is a set of cells to be corrected.

Figure 2:
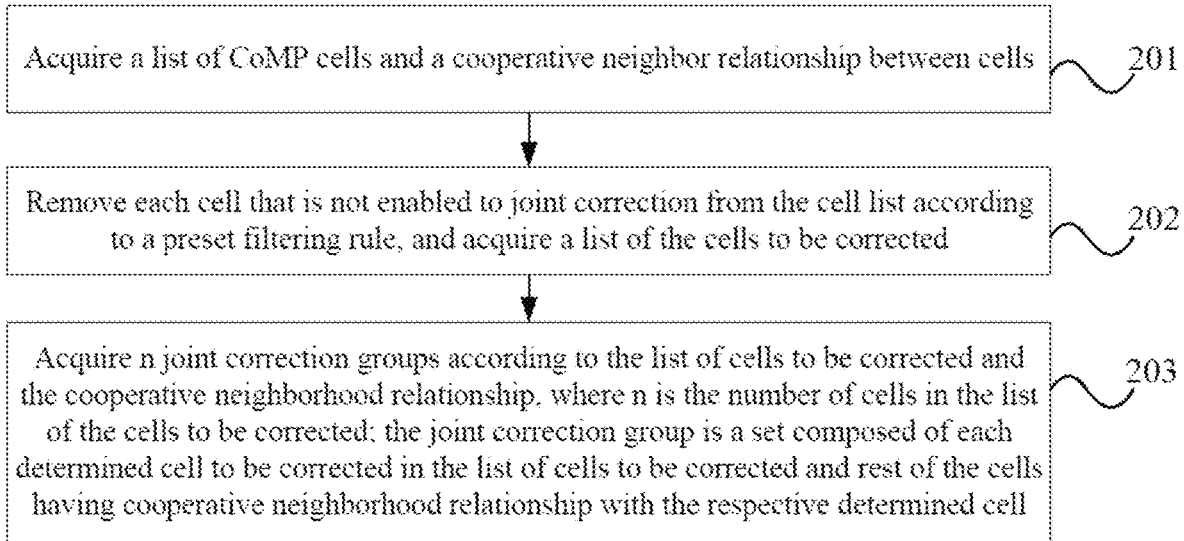
FIG. 2 depicts a flowchart showing S101 of a method for correcting a cell antenna according to an embodiment of the present disclosure as shown in FIG. 1.

Referring to FIG. 2, S101 includes the following operations.

At S201, a list of Coordinated Multiple Points (CoMP) cells and a cooperative neighbor relationship between cells are acquired.

Figure 3:
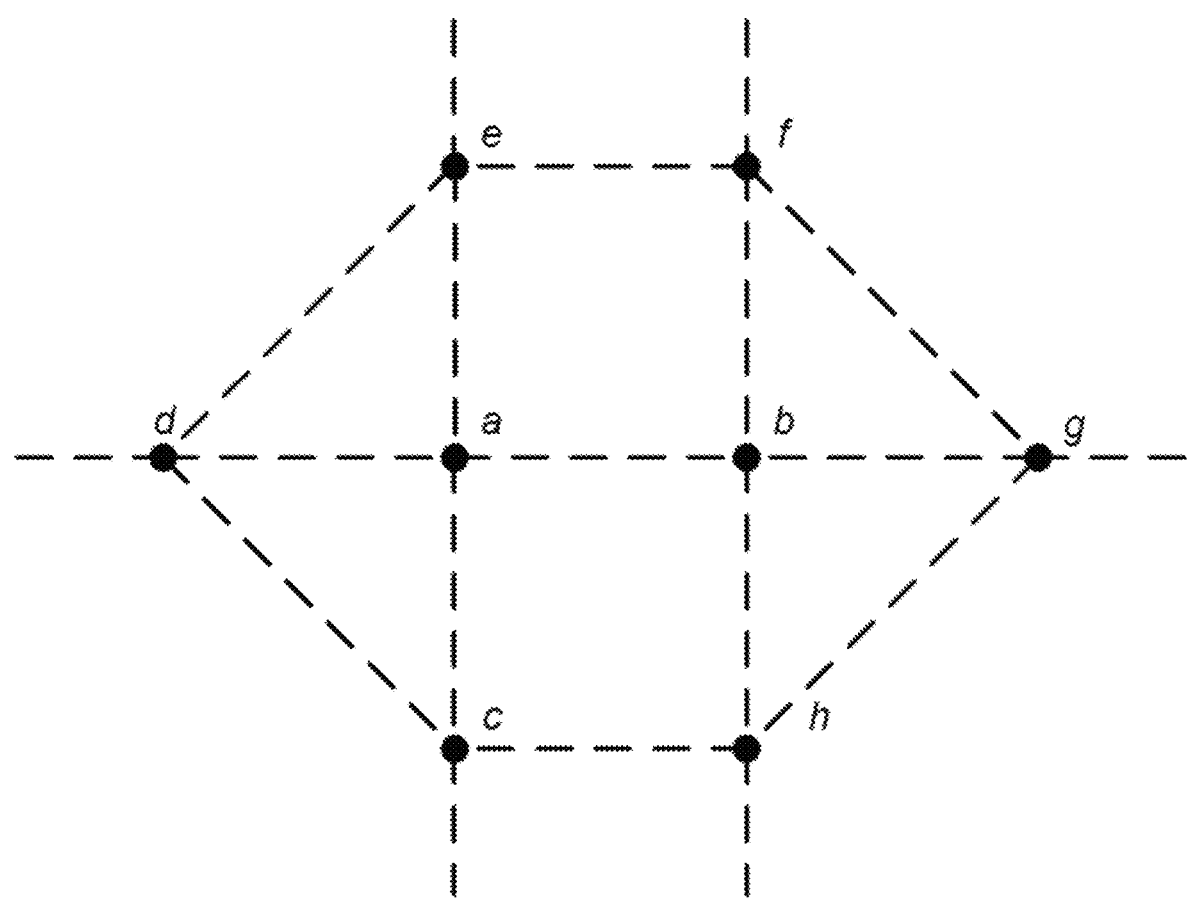
FIG. 3 depicts a CoMP cell topology related to a method for correcting a cell antenna according to an embodiment of the present disclosure.

Specifically, a CoMP cell is a cell where CoMP technique can be applied. Based on the cooperative neighborhood relationship between the cells. The cooperative relationship between CoMP cells is the cooperative relationship in which the cells cooperate with each other to provide services for a particular user. As shown in FIG. 3, nodes A, B, C, D, E, F, G and H are all CoMP cells, and a connecting line between nodes represents the cooperative neighborhood relationship between CoMP cells.

At S202, a cell that is not enabled for the joint correction is removed from the cell list according to a preset filtering rule, and a list of the cells to be corrected is acquired.

In some implementations, the filtering rule may be that the threshold for numbers of RRUs corresponding to the CoMP cells or a specific type of RRU, and the threshold or conditions requirement for the state of the transceiver channel. It is apparent that, the filtering rule above is illustrated merely by way of example, and can also include other rules in practical situations, and which are not described in detail here.

At S203, n joint correction groups are acquired according to the list of cells to be corrected and the cooperative neighborhood relationship, where n is the number of cells in the list of the cells to be corrected. The joint correction group is a set composed of each determined cell to be corrected in the list of cells to be corrected and the rest of the cells with cooperative neighborhood relationships with the respective determined cell.

In an implementation, each cell in the list of cells to be corrected is selected as the central CoMP cell successively, and the cells to be corrected are looked for according to the cooperative neighborhood relationship of the central CoMP cell, and a joint correction group is established with the central CoMP cell and the found cells.

As shown in FIG. 3, a joint correction group {a,b,c,d,e} is established in case that cell a is taken as the center CoMP cell. A similar procedure applies to the rest of the cells until each cell in the list of cells to be corrected is taken as the center for establishing a respective joint correction group.

At S102, the correction parameters reported after mutual transmissions of correction sequences at several different frequencies by the cells to be corrected are received, and the correction parameters are updated to the correction record table.

In an implementation, all cells to be corrected are notified to send correction sequences to each other. After receiving the notification, each of the cells to be corrected sends correction sequences at several different frequencies and receives correction sequences from the rest of cells to be corrected, and measures and records correction parameters. The correction parameters include correction routes, correction levels, and the like.

In an implementation, a base station informs all cells to be corrected to transmit and receive the correction sequences with power offsets of 0 db, 5 db, −5 db, 10 db and −10 db. The likelihood of the success of the correction is increased by the active attempt of mutual correction with different powers by altering the powers, thus preventing the correction failure caused by low signal-to-noise ratio due to excessive interference power or the correction failure caused by excessive power superposition of RRU channels and saturation. Then, each cell to be corrected acts as the transmitter of the correction sequences and the rest of the cells act as the receivers of the correction sequences, such that, successive transmission and reception of the correction sequences are performed. Each cell to be corrected which acts as the receiver detects and reports the correction parameters such as correction route and correction level. Finally, the base station receives all the correction parameters and updates the correction parameters to the correction record table of the corresponding power respectively. It is apparent that, the offset power above is illustrated merely by way of example, and can also include other rules in practical situations, and which is not described in detail here.

At S103, a reference cell and a reference channel corresponding to the reference cell in the joint correction group are selected according to the correction record table.

At S104, a first parameter during the transmission and reception, reported after the mutual transmissions of the correction sequences via the reference channel and the non-reference channel is acquired, and a first correction value of the non-reference channel is calculated according to the first parameter.

In an implementation, the calculation of the first correction value at S104 can be performed in the following three methods.

The first method is that both the reference channel and the non-reference channel are self-corrected.

The self-correction compensation values reported by all cells to be corrected after self-correction are received, and the first correction value is calculated with the following equation:

$$y_1 = \frac{x^{1 \to 2}}{x^{2 \to 1}} \cdot \frac{w_{AC_1}}{w_{AC_2}}$$

The first parameter includes a signal parameter of a reference channel and a signal parameter of a non-reference channel. $y_1$ is a first correction value; $x^{1 \to 2}$ is the signal parameter of the reference channel, which is the signal parameter measured when the correction sequences are sent via the reference channel and received via the non-reference channel. $x^{2 \to 1}$ is the signal parameter of the non-reference channel, which is a signal parameter measured when correction sequences are sent via the non-reference channel and received via the reference channel. $w_{AC_1}$ is the compensation value of self-correction of the reference channel, and the weight for the self-correction is $$w_{AC_1} = \frac{L_{i1}}{L_{m1}} \cdot \left( \frac{T_{i1}/R_{m1}}{T_{p1}/R_{p1}} \right).$$

RRU uplink and downlink self-correction channels corresponding to the reference channel are i1 and m1, respectively. p1 denotes the reference channel or non-reference channel. $L_i$ denotes the complex transmission factor from the power divider to the coupling disk. $T_i$ denotes the complex transmission factor of the RRU transmitting channel. $R_i$ denotes the complex transmission factor of the RRU receiving channel. The correction weight of a channel is taken as the correction parameter of the channel. $w_{AC_2}$ is the correction parameter of the non-reference channel. And the correction parameters of the non-reference channel and the reference channel are generally the same, and which will not be described in detail here.

It should be noted that the first correction value calculated in the above case will align all phases to the aligned phases of the self-corrected reference channel $$A = \frac{T_{i1} \cdot L_{i1}}{R_{m1} \cdot L_{m1}},$$

the parameters are the parameters of the RRU where the reference channel is located.

The second method is that both the reference channel and the non-reference channel are not self-corrected.

In an implementation, the first correction value of the non-reference channel is calculated directly from the correction compensation value and the first parameter, and through the following equation:

$$y_1 = \frac{x^{1 \to 2}}{x^{2 \to 1}}.$$

$y_1$ is the first correction value, $x^{1 \to 2}$ is the signal parameter of the reference channel and $x^{2 \to 1}$ is the signal parameter of the non-reference channel.

The third method is that the reference channel is self-corrected and the non-reference channel is not self-corrected.

In some implementations, the self-correction compensation value of the reference channel is acquired, and then the first correction value of the non-reference channel is calculated according to the self-correction channel of the reference channel and the first parameter, and through the following equation:

$$y_1 = \frac{x^{1 \to 2}}{x^{2 \to 1}} \cdot w_{AC_1}.$$

$y_1$ is the first correction value, $x^{1 \to 2}$ is the signal parameter of the reference channel, $x^{2 \to 1}$ is the signal parameter of the non-reference channel and $w_{AC_1}$ is the compensation value of the self-correction of the reference channel.

It should be noted that in the third case, all channels on the RRU corresponding to the reference channel are aligned to $$A = \frac{T_{i1} \cdot L_{i1}}{R_{m1} \cdot L_{m1}},$$

and directly align the non-reference channel to A through self-correction of the reference channel through the above expression.

There is no case where the reference channel is not self-corrected while the non-reference channel is self-corrected, since during the selection of the reference channel, if both self-corrected and non-self-corrected channels are present, the self-corrected channel has the priority to be selected as the reference channel.

At S105, the first correction value is sent to the corresponding non-reference channel for correction.

In some implementations, after receiving the first correction value, the non-reference channel performs correction according to the following equation:

$$y = y_1 \cdot u.$$

If the non-reference channel is self-corrected, u is the self-correction compensation value of the RRU corresponding to the non-reference channel, $$u = \frac{W_{DL}}{W_{UL}},$$

$W_{UL}$ is the weight of uplink self-correction of the non-reference channel, and $W_{DL}$ is the weight of downlink self-correction of the non-reference channel. According to the path in which the correction signal passes, the loopback signal received by each channel during the downlink self-correction of the RRU is:

$$\begin{cases} t_i = R_{CAL} \cdot T_i \cdot L_i \\ t_j = R_{CAL} \cdot T_j \cdot L_j \end{cases},$$

where i and j are channel subscripts, $\{i, j\} \in [0, K_a-1]$, Ka is the number of RRU antennas, $i \neq j$, $R_{CAL}$ is the complex transmission factor from the power splitter output to the receiver. Assuming that the self-correction channel selected for downlink self-correction is i, the weight of downlink self-correction is $$\begin{aligned} W_{DL} &= [w_{DL}(0), \ldots, w_{DL}(i), \ldots, w_{DL}(j), \ldots, w_{DL}(K_a-1)] \\ &= \left[\frac{t_i}{t_0}, \ldots, \frac{t_i}{t_i}, \ldots, \frac{t_i}{t_j}, \ldots, \frac{t_i}{t_{K_a-1}}\right] \\ &= \left[\frac{T_i \cdot L_i}{T_0 \cdot L_0}, \ldots, \frac{T_i \cdot L_i}{T_i \cdot L_i}, \ldots, \frac{T_i \cdot L_i}{T_j \cdot L_j}, \ldots, \frac{T_i \cdot L_i}{T_{K_a-1} \cdot L_{K_a-1}}\right] \end{aligned}.$$

Similarly, according to the path taken by the correction signal, the loopback signal received by each channel during uplink self-correction of RRU is:

$$\begin{cases} r_m = T_{CAL} \cdot R_m \cdot L_m \\ r_n = T_{CAL} \cdot R_n \cdot L_n \end{cases},$$

m and n are channel subscripts, $\{m, n\} \in [0, K_a-1]$, Ka is the number of RRU antennas, and $m \neq n$. Uplink self-correction supports adaptive reference channel selection, in which the reference channel can be selected according to the principle of maximum SINR, and $T_{CAL}$ is the complex transmission factor from the transmitter to the input of the power divider. In case that the self-correction channel selected for uplink self-correction is m, the weight of the uplink self-correction is—:

$$\begin{aligned} W_{UL} &= [w_{UL}(0), \ldots, w_{UL}(m), \ldots, w_{UL}(n), \ldots, w_{UL}(K_a-1)] \\ &= \left[\frac{r_m}{r_0}, \ldots, \frac{r_m}{r_m}, \ldots, \frac{r_m}{r_n}, \ldots, \frac{r_m}{r_{K_a-1}}\right] \\ &= \left[\frac{R_m \cdot L_m}{R_0 \cdot L_0}, \ldots, \frac{R_m \cdot L_m}{R_m \cdot L_m}, \ldots, \frac{R_m \cdot L_m}{R_n \cdot L_n}, \ldots, \frac{R_m \cdot L_m}{R_{K_a-1} \cdot L_{K_a-1}}\right] \end{aligned}$$

If the reference channel is not self-corrected, then u=1.

Compared with some technical schemes, in some embodiments of the present disclosure, a joint correction group containing a plurality of cells to be corrected is acquired.

Correction parameters reported by the cells to be corrected after mutual transmission of the correction sequences between the cells to be corrected are received. A reference cell and a reference channel on the reference cell are selected from the joint correction group according to the correction record table storing the correction parameters. The first parameters reported through the channels are received after the mutual transmissions of correction signals between the reference channel and non-reference channels, so that the first correction value required by alignment of the non-reference channel with the reference channel can be directly calculated according to the first parameters. Then the first correction value is sent to the corresponding non-reference channel for non-reference channel in the cell for channel correction. Thereby, antenna corrections on a plurality of cells to be corrected in the joint correction group are performed simultaneously.

Figure 4:
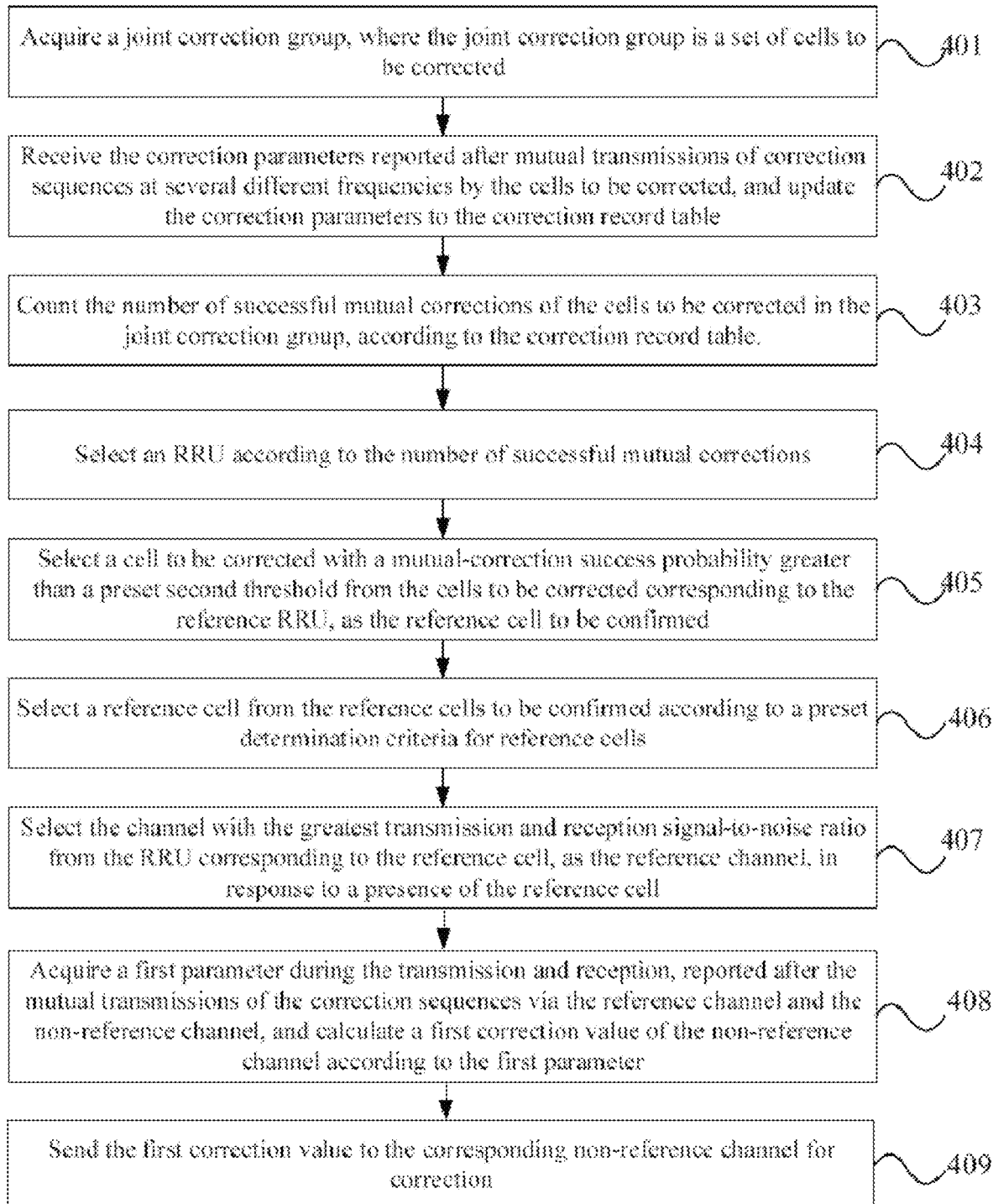
FIG. 4 depicts a flowchart showing a method for correcting a cell antenna according to embodiment two of the present disclosure.

Embodiment two of the present disclosure provides a method for correcting cell antennas. This embodiment is generally the same as embodiment one, but the difference lies in the details for the selection of reference cells and reference channels. As shown in FIG. 4, the method includes the following operations.

At S401, a joint correction group is acquired, where the joint correction group is a set of cells to be corrected.

S401 in this embodiment is substantially the same as S101 in the above embodiment, and which will not be described in detail here.

At S402, the correction parameters reported after mutual transmissions of correction sequences at several different frequencies by the cells to be corrected are received, and the correction parameters are updated to the correction record table.

S402 in this embodiment is substantially the same as S102 in the above embodiment, and which will not be described in detail here.

At S403, the number of successful mutual corrections of the cells to be corrected in the joint correction group is counted, according to the correction record table.

In an implementation, successful mutual correction means that each of two cells to be corrected successfully receives the correction sequence sent by the other side and the corresponding correction parameters in the correction record table meet the preset first threshold.

In some implementations, successful mutual correction between any two cells means that at least one determined physical channel in two cells is present via which the receiving end can detect the correction signal sent by at least one physical channel in the other cell, and the signal detection result passes all the threshold judgment criteria of air interface correction, and the reverse transmission and reception of signal also meets the detection passing conditions.

At S404, a reference radio remote unit (RRU) is selected according to the number of successful mutual corrections.

At 405, a cell to be corrected with a mutual-correction success probability greater than a preset second threshold is selected from the cells to be corrected corresponding to the reference RRU, as the reference cell to be confirmed.

In an implementation, among the cells corresponding to the reference RRU, if it is found that the success probability of mutual correction of at least one cell with the reset of cells exceeds the set second threshold, it indicates that the reference cell presents in the correction record table of the offset power, and the correction record table of other power offsets can be served as a reference for increasing the communication success probability or relaying communication.

At S406, a reference cell is selected from the reference cells to be confirmed according to preset determination criteria for reference cells.

In an implementation, the reference cell determination criteria is to find out the cells with successful mutual correction first. The found cells are then ranked according to the number of successes. The first few cells with a higher number of successes are kept. Then the reference cell is selected from the kept cells according to the principle that the average signal-to-noise ratio is higher.

At S407, the channel with the greatest transmission and reception signal-to-noise ratio is selected from the RRU corresponding to the reference cell, as the reference channel, in response to the presence of the reference cell.

In some implementations, for cells that do not support self-correction, phase alignment to the same reference channel is performed. So, in such a case, the reference channel of the cells shall be selected as the channel with the best signal quality according to the reference channel selection algorithm. And the reference channel serves as the reference of the whole mutual-correction alignment, and all channels shall be aligned to that reference channel of the reference cell. For the cells that support self-correction, the reference channel of each pair of cells meets uniqueness, so it is necessary to select a group of channels with the best quality of received and transmitted signals and the greatest bottom-line signal-to-noise ratio as the reference channels.

In an example where a respective reference channel is to be selected between cell 1 and cell 2, when cell 1 sends a correction sequence, cell 2 receives and detects the correction sequence, and gets a group of detection results SINR1_2. When cell 2 sends a correction sequence, cell 1 receives and detects the correction sequence, and gets a group of detection results SINR2_1. First, the channel group with failed correction is eliminated. Then, a group of channels with the best received and transmitted signal quality are selected as the reference channels from all the remaining channels with successful correction. If several such channels are present, the channel with the smallest channel number in the reference cell is first selected, and second, the channel with the smallest channel number and value is selected. A result with a maximum signal-to-noise ratio in SINR1_2 and a result with a maximum signal-to-noise ratio in SINR2_1 are found. If the two results correspond to the same group of channels, the reference channel can be determined and thus selected. If the two maximum values correspond to different groups of channels respectively, the selection is made according to the least shortage criterion. That is, the minimum signal-to-noise ratio received by each group of channels in all detection results represents the bottom-line capability of the group. Then, the channel with the largest bottom-line signal-to-noise ratio is selected as the final reference channel.

At S408, a first parameter during the transmission and reception, reported after the mutual transmissions of the correction sequences via the reference channel and the non-reference channel is acquired, and a first correction value of the non-reference channel is calculated according to the first parameter.

S304 in this embodiment is substantially the same as S104 in the above embodiment, and which will not be described in detail here.

At S409, the first correction value is sent to the corresponding non-reference channel for correction.

S305 in this embodiment is substantially the same as S105 in the above embodiment, and which will not be described in detail here.

Compared with some technical schemes, in this embodiment, several specific and practical conditions are set for the selection of reference cells and reference channels in addition to embodiment one. So that the cells that can be selected in the shortest time are more reliable and accurate, and which are desirable by the users. Further, the accuracy of the reference cells ensures the correction results of all cells are unified into a reliable result, improving the correction effect and the correction success rate.

Figure 5:
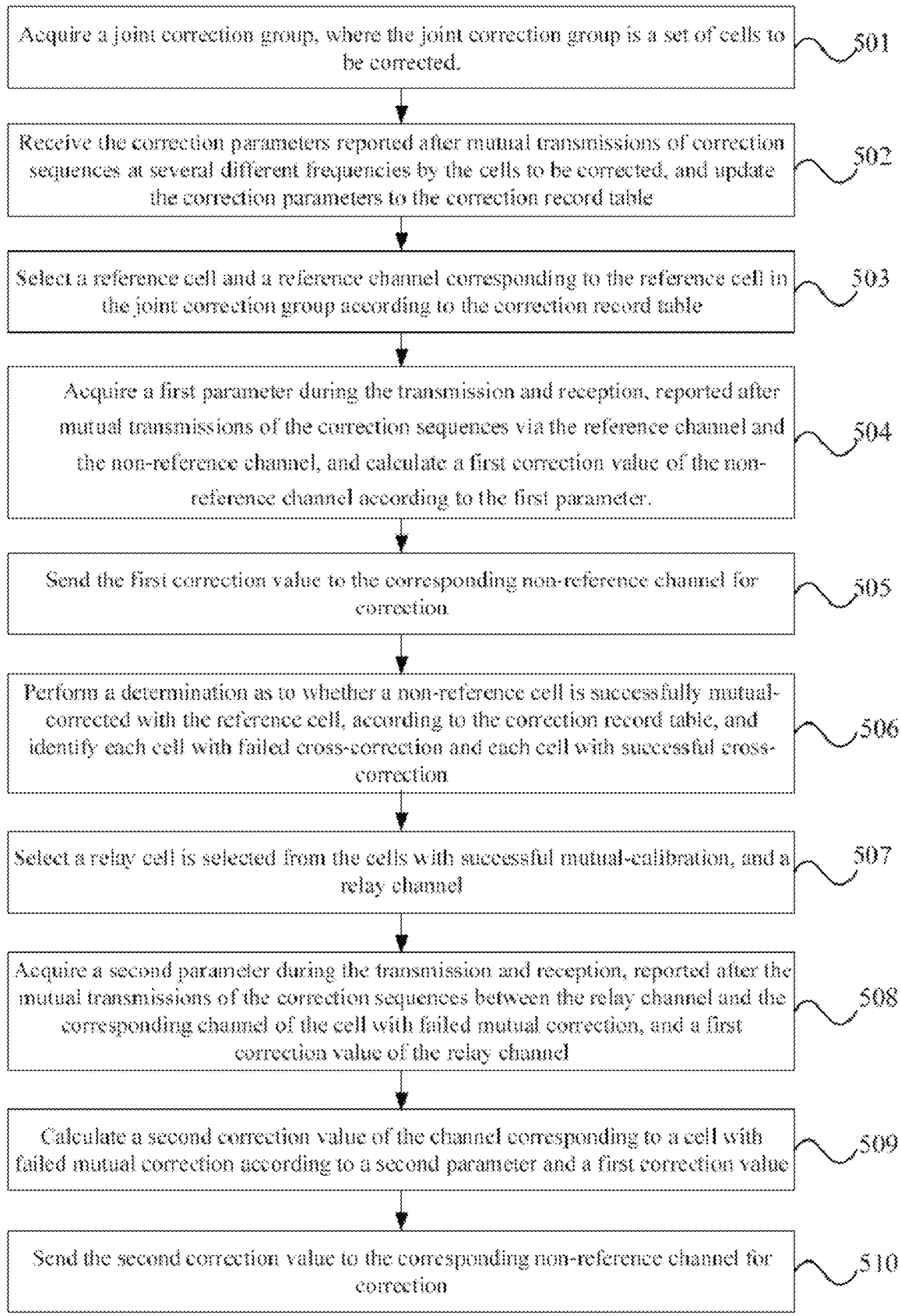
FIG. 5 depicts a flowchart showing a method for correcting a cell antenna according to an embodiment of the present disclosure.

Embodiment three of the present disclosure provides a method for correcting a cell antenna. This embodiment is generally the same as the embodiment one, but the difference lies in that the cells with failed correction in the above embodiment are also corrected. As shown in FIG. 5, the method includes the following operations.

At S501, a joint correction group is acquired, where the joint correction group is a set of cells to be corrected.

S501 in this embodiment is substantially the same as S101 in the above embodiment, and which will not be described in detail here.

At S502, the correction parameters reported after mutual transmissions of correction sequences at several different frequencies by the cells to be corrected are received, and the correction parameters are updated to the correction record table.

S502 in this embodiment is substantially the same as S102 in the above embodiment, and which will not be described in detail here.

At S503, a reference cell and a reference channel corresponding to the reference cell in the joint correction group are selected according to the correction record table.

S503 in this embodiment is substantially the same as S103 in the above embodiment, and which will not be described in detail here.

At S504, a first parameter during the transmission and reception, reported after mutual transmissions of the correction sequences between the reference channel and the non-reference channel is acquired, and a first correction value of the non-reference channel is calculated according to the first parameter.

S504 in this embodiment is substantially the same as S104 in the above embodiment, and which will not be described in detail here.

At S505, the first correction value is sent to the corresponding non-reference channel for correction.

S505 in this embodiment is substantially the same as S105 in the above embodiment, and which will not be described in detail here.

At S506, a determination is performed as to whether a non-reference cell is successfully mutual-corrected with the reference cell, according to the correction record table, and each cell with failed mutual correction and each cell with successful mutual correction are identified.

In some implementations, the successful mutual correction means that the reference cell successfully receives the correction sequence sent by the non-reference cell, the non-reference cell successfully receives the correction sequence sent by the reference cell, and the corresponding correction parameters in the correction record table meet the preset first threshold. Based on the definition of the successful mutual correction, non-reference cells are divided into cells with successful mutual correction and cells with failed mutual correction.

It should be noted that the failure is generally due to the failure in transmission/reception of the correction sequence to/from the reference channel.

At S507, a relay cell is selected from the cells with successful mutual correction, and a relay channel is selected.

In some implementations, the method of selecting the relay cell and the relay channel is generally the same as that of selecting the reference cell and the reference channel in the embodiment as described above, and which will not be repeated here.

At S508, a second parameter during the transmission and reception, reported after the mutual transmissions of the correction sequences between the relay channel and the corresponding channel of the cell with failed mutual correction, and a first correction value of the relay channel are acquired.

At S509, a second correction value of the channel corresponding to a cell with failed mutual correction is calculated according to a second parameter and a first correction value.

In some implementations, similar to the calculation for the first correction value, there are three cases for the second correction value.

In the first case, both the relay channel and the channel with failed correction are self-corrected:

$$y_2 = \frac{x^{3 \to 4}}{x^{4 \to 3}} \cdot \frac{w_{AC_3}}{w_{AC_4}} \cdot y_1.$$

$y_2$ is the second correction value, $y_1$ is the first correction value of the relay channel, $x^{3 \to 4}$ the signal parameter of the relay channel, $x^{4 \to 3}$ is the signal parameter of the channel with failed correction, $w_{AC_3}$ is the correction compensation value of self-correction of the relay channel, and $w_{AC_4}$ is the correction compensation value of self-correction of the channel with failed correction.

In the second case, neither the relay channel nor the channel with failed correction is self-corrected:

$$y_2 = \frac{x^{3 \to 4}}{x^{4 \to 3}} \cdot y_1.$$

$y_2$ is the second correction value, $y_1$ is the first correction value of the relay channel, $x^{3 \to 4}$ is the signal parameter of the relay channel, and $x^{4 \to 3}$ is the signal parameter of the channel with failed correction.

In the third case, the relay channel is self-corrected and the channel with failed correction is not self-corrected:

$$y_2 = \frac{x^{3 \to 4}}{x^{4 \to 3}} \cdot w_{AC_3} \cdot y_1.$$

$y_2$ is the second correction value, $y_1$ is the first correction value of the relay channel, $x^{3 \to 4}$ is the signal parameter of the relay channel, $x^{4 \to 3}$ the signal parameter of the channel with failed correction, and $w_{AC_3}$ is the correction compensation value of the self-correction of the relay channel.

It should be noted that the parameters used in the above three cases are generally the same as those used at S104 in the above embodiment, and which will not be described in detail here.

At S510, the second correction value is sent to the corresponding non-reference channel for correction.

S510 in this embodiment is substantially the same as S105 in the above embodiment, and which will not be described in detail here.

It should be noted that S506 through S509 in this embodiment can also be performed before the performing of S505. In such a case, the first correction value and the second correction value can be sent to the corresponding non-reference channel for correction.

Compared with some technical schemes, in this embodiment, the uncorrected channels in embodiment one are also corrected by selecting the relay channel to transfer the correction value, so that more cells can be corrected and the correction effect can be improved.

In order to enable those having ordinary skills in the art to understand the general process of the method for correction of cell antennas provided in the above embodiments of the present disclosure application, a specific application scenario is illustrated by way of an example below.

Figure 6:
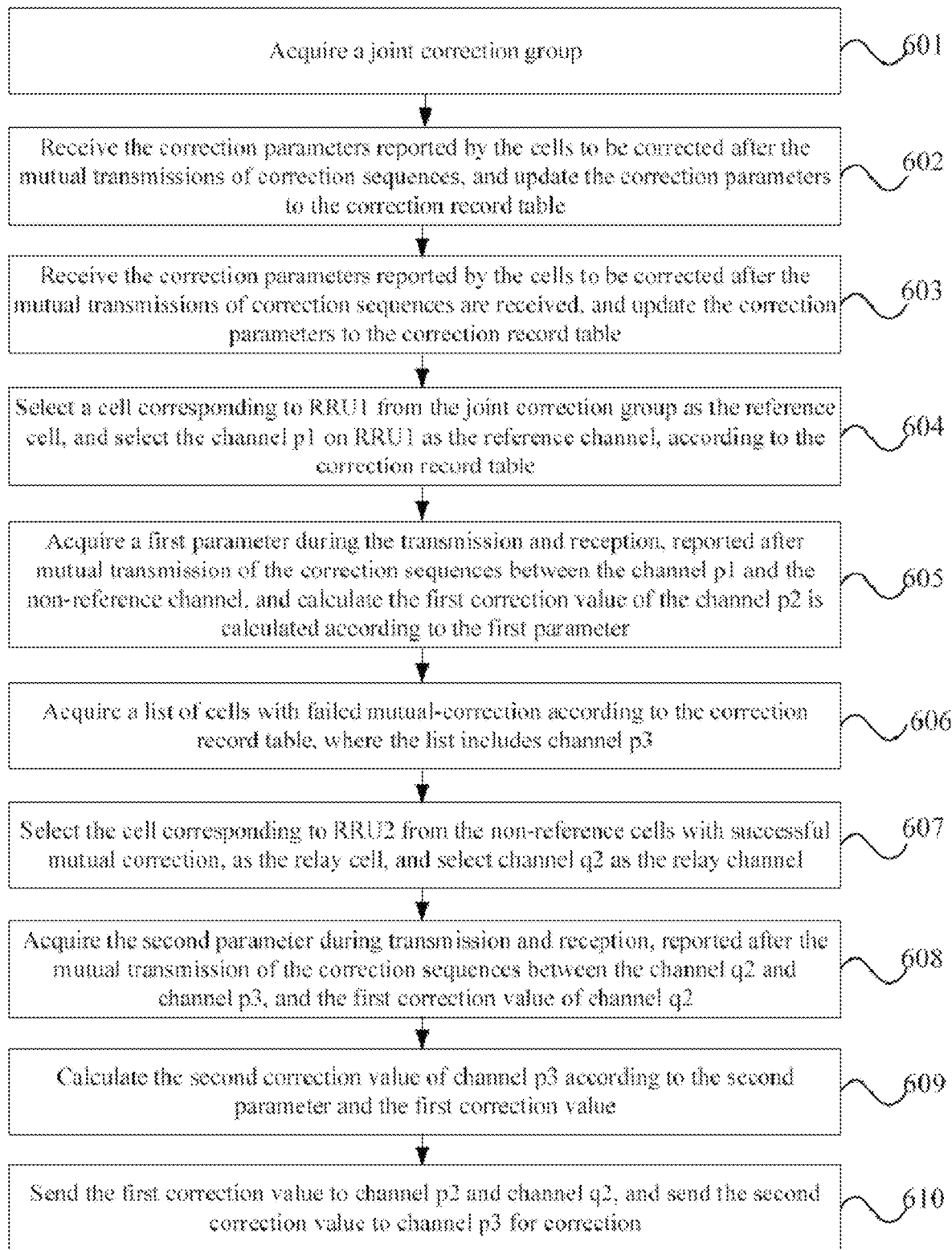
FIG. 6 depicts a flowchart showing a method for correcting a cell antenna according to an embodiment of the present disclosure.
Figure 7:
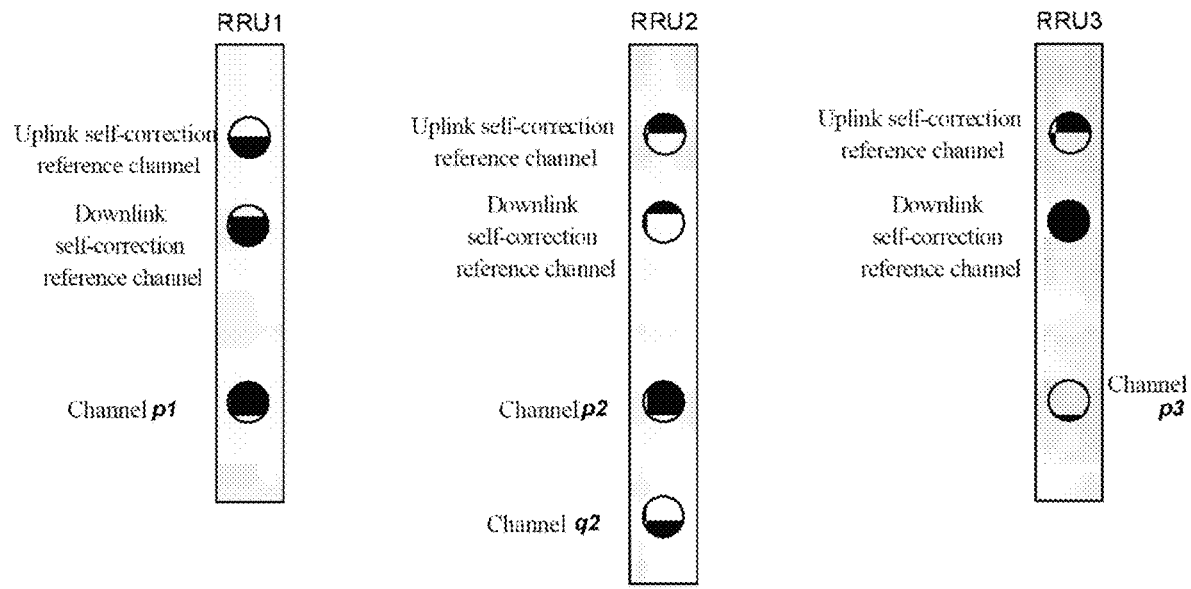
FIG. 7 depicts a flowchart showing a method for correcting a cell antenna according to an embodiment of the present disclosure.

An embodiment of the present disclosure provides a method for correcting a cell antenna, which is applied in the application scenario as shown in FIG. 7. Referring to FIG. 7, an example is shown where, RRU1, RRU2, and RRU3 each corresponds to a cell, and each can perform self-correction. RRU1 and RRU2 can send and receive correction signals to and from each other, and RRU2 and RRU3 can send and receive correction signals to and from each other. But RRU1 and RRU3 can not send and receive correction signals to and from each other. Referring to FIG. 6, the method includes the following operations.

At S601, a joint correction group is acquired.

In some implementations, a joint correction group presents in the environment, which includes cells corresponding to RRU1, RRU2 and RRU3.

At S602, a compensation value of self-correction reported by a cell to be corrected is received.

In some implementations, RRU1 performs uplink self-correction to obtain $W_{UL}^{①}$. RRU1 performs downlink self-correction to obtain $W_{DL}^{①}$. RRU2 performs uplink self-correction to obtain $W_{DL}^{②}$. RRU2 performs downlink self-correction to obtain $W_{UL}^{②}$. RRU3 performs uplink self-correction to obtain $W_{DL}^{③}$. RRU3 performs downlink self-correction to obtain $W_{DL}^{③}$. The superscripts of numbers 1, 2 and 3 correspond to RRU1, RRU2 and RRU3 respectively. The compensation values for self-correction are $$W_{AC}^{①} = \frac{W_{DL}^{①}}{W_{UL}^{①}}, W_{AC}^{②} = \frac{W_{DL}^{②}}{W_{UL}^{②}}, \text{ and } W_{AC}^{③} = \frac{W_{DL}^{③}}{W_{UL}^{③}}.$$

At S603, the correction parameters reported by the cells to be corrected after the mutual transmissions of correction sequences are received, and the correction parameters are updated to the correction record table.

At S604, a cell corresponding to RRU1 is selected from the joint correction group as the reference cell, and the channel p1 on RRU1 is selected as the reference channel, according to the correction record table.

In some implementations, the non-reference channels are channel p2, channel q2, and channel p3.

At S605, a first parameter during the transmission and reception, reported after mutual transmission of the correction sequences between channel p1 and the non-reference channel is acquired, and the first correction value of channel p2 is calculated according to the first parameter.

In some implementations, $$y_1 = \frac{x^{1 \to 2}}{x^{2 \to 1}} \cdot \frac{w_{AC_1}}{w_{AC_2}} \cdot u.$$

$y_1$ is the first correction value, $x^{1 \to 2}$ is the signal parameter of channel p1, $x^{2 \to 1}$ is the signal parameter of channel p2, $w_{AC_1}$ is the correction parameter of channel p1, $w_{AC_2}$ is the correction parameter of channel p2, and u is the compensation value of self-correction of channel p2 $W_{AC}^{②}$.

At S606, a list of cells with failed mutual correction is acquired according to the correction record table, where the list includes channel p3.

At S607, the cell corresponding to RRU2 is selected from the non-reference cells with successful mutual correction, as the relay cell, and channel q2 is selected as the relay channel.

At S608, the second parameter during transmission and reception, reported after the mutual transmission of the correction sequences between channel q2 and channel p3, and the first correction value of channel q2 are acquired.

In some implementations, since channel q2 and channel p2 are within the same RRU, i.e., RRU2, the same first correction value $y_1$ is utilized.

It should be noted that in this embodiment, when channels such as reference channel and relay channel are selected, each channel is independent of each other. For example, p2 and q2 are two different channels on the same RRU. However, p2 and q2 are allowed to be the same channel, if a better channel to be corrected cannot be found on the RRU corresponding to the relay cell.

At S609, the second correction value of channel p3 is calculated according to the second parameter and the first correction value.

In some implementations, the second correction value is calculated by the following equation:

$$y_2 = \frac{x^{2 \to 3}}{x^{3 \to 2}} \cdot \frac{w_{AC_2}}{w_{AC_3}} \cdot y_1.$$

$y_2$ is the second correction value, $y_1$ is the first correction value, $x^{2 \to 3}$ is the signal parameter of channel q2, $x^{3 \to 2}$ is the signal parameter of channel p3, $w_{AC_2}$ is the correction parameter of channel q2, and $w_{AC_3}$ is the correction parameter of channel p3.

At S610, the first correction value is sent to channel p2 and channel q2, and the second correction value is sent to channel p3 for correction.

Compared with some technical schemes, in some embodiments of the present disclosure, a joint correction group containing three cells to be corrected is acquired. Correction parameters reported by the cells to be corrected after mutual transmission of the correction sequences between the cells to be corrected are received. A reference cell and a reference channel on the reference cell are selected from the joint correction group according to the correction record table storing the correction parameters. The first parameters reported through the channels are received after the mutual transmissions of correction signals between the reference channel and non-reference channels, so that the first correction value required by alignment of the non-reference channel with the reference channel can be directly calculated according to the first parameters. Then the first correction value is sent to the corresponding non-reference channel for non-reference channel in the cell for channel correction. Thereby, antenna corrections on a plurality of cells to be corrected in the joint correction group are performed simultaneously.

It shall be noted that, the processes of the above methods are divided only for clarity of description, and can be combined into one single process or some processes can be divided into several processes, any process in which identical logical relationship to the present disclosure is included shall be within the scope of the present disclosure. The algorithm or process with any minor modifications or insignificant designs which do not change the core design of the algorithm and process, shall be within the scope of the present disclosure.

Figure 8:
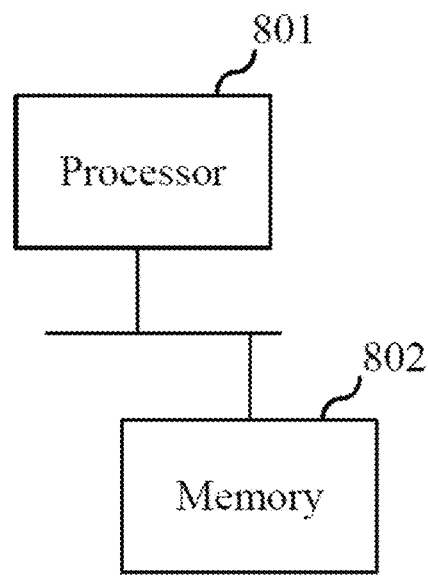
FIG. 8 depicts a schematic diagram showing an electronic device according to an embodiment of the present disclosure.

An embodiment of present disclosure provides an electronic device. As shown in FIG. 8, the electronic device includes at least one processor 801, and a memory 802 in communication with the at least one processor 801, in which the memory 802 stores an instruction executable by the at least one processor 801, which when executed by the at least one processor 801, cause the processor to carry out any one of the methods as described above.

The memory 802 and the processor 801 are connected by a bus. The bus can include any number of interconnected buses and bridges, and the bus connects various circuits of one or more processors 801 and the memory 802 together. The bus can also connect various other circuits, such as peripheral devices, voltage regulators, power management circuits, etc., all of which are well-known in the art, so they will not be further described here. The bus interface provides an interface between the bus and the transceiver. The transceiver can be one element or a plurality of elements, such as a plurality of receivers and transmitters, providing a unit for communicating with various other devices over a transmission medium. The data processed by processor 801 is transmitted over the wireless medium through the antenna. Furthermore, the antenna also receives the data and transmits it to processor 801.

The processor 801 is configured for managing the bus and general processing, and can also provide various functions, including timing, a peripheral interface, voltage regulation, power management and other control functions. And the memory 802 can be utilized to store data for the processor 801 during operations.

Another embodiment of the present disclosure provides a computer-readable storage medium storing thereon a computer program. The computer program, when executed by a processor, causes the processor to carry out the method in any one of the embodiments as described above.

Compared with some technical schemes, in some embodiments of the present disclosure, a joint correction group containing a plurality of cells to be corrected is acquired. Correction parameters reported by the cells to be corrected after mutual transmission of the correction sequences between the cells to be corrected are received. A reference cell and a reference channel on the reference cell are selected from the joint correction group according to the correction record table storing the correction parameters. The first parameters reported through the channels are received after the mutual transmissions of correction signals between the reference channel and non-reference channels, so that the first correction value required by alignment of the non-reference channel with the reference channel can be directly calculated according to the first parameters. Then the first correction value is sent to the corresponding non-reference channel for non-reference channel in the cell for channel correction. Thereby, antenna corrections on a plurality of cells to be corrected in the joint correction group are performed simultaneously.

That is, it shall be appreciated by those having ordinary skill in the art that all or part of the processes for carrying out the above-mentioned method embodiments can be implemented by instructing related hardware through a program, which is stored in a storage medium and includes several instructions to cause a device (such as a single chip, a chip, etc.) or a processor perform all or part of the processes of the methods in various embodiments of the present disclosure. The aforementioned storage media include: U disk (flash disk), mobile hard disk, Read-Only Memory (ROM), Random Access Memory (RAM), magnetic disk or optical disk and other media that can store program codes.

It shall be understood by those having ordinary skill in the art that the above are some embodiments for implementing the present disclosure, and in practical application, various alternations in form and details can be made without departing from the scope of the present disclosure.

What is claimed is:

1. A method for correcting a cell antenna, comprising,
   acquiring a joint correction group, wherein the joint correction group is a set of cells to be corrected;
   receiving correction parameters reported after mutual transmissions of correction sequences at several different frequencies by the cells to be corrected, and updating the correction parameters to a correction record table;
   selecting a reference cell from the joint correction group, and selecting a reference channel corresponding to the reference cell, according to the correction record table;
   acquiring a first parameter during transmission and reception of the correction sequences, reported after mutual transmissions of the correction sequences between the reference channel and a non-reference channel, and calculating a first correction value of the non-reference channel according to the first parameter; and
   sending the first correction value to the corresponding non-reference channel for correction, such that antenna corrections on the set of cells to be corrected in the joint correction group are performed simultaneously.

2. The method of claim 1, wherein acquiring the joint correction group, comprises,
   acquiring a list of Coordinated Multiple Points (COMP) cells and a cooperative neighbor relationship between the cells;
   removing each cell that is not enabled for mutual correction from the list of COMP cells according to a preset filtering rule, and acquiring a list of the cells to be corrected; and
   acquiring n joint correction groups according to the list of cells to be corrected and the cooperative neighborhood relationship between the cells, where n is a quantity of cells in the list of the cells to be corrected; wherein, the joint correction group is a set of each determined cell to be corrected in the list of cells to be corrected, and rest of the cells having cooperative neighborhood relationship with the respective determined cell.

3. The method of claim 1, wherein selecting the reference cell from the joint correction group, and selecting the reference channel corresponding to the reference cell, according to the correction record table, comprises,
   counting a quantity of successful mutual corrections of the cells to be corrected in the joint correction group, according to the correction record table, wherein a successful mutual correction comprises: each of two cells to be corrected successfully receives a correction sequence sent by the other one of the two cells, and a respective correction parameter in the correction record table meets a preset first threshold;
   selecting a reference radio remote unit (RRU), according to a quantity of the successful mutual corrections;

selecting a cell to be corrected having a likelihood of successful mutual correction greater than a preset second threshold, from the cells to be corrected corresponding to the reference RRU, as one of at least one reference cell to be confirmed;

selecting a reference cell from the at least one reference cell to be confirmed according to a preset reference cell determination criteria for reference cell; and selecting a channel with a greatest signal-to-noise ratio of transmission and reception from the RRU corresponding to the selected reference cell, as the reference channel, in response to the presence of the selected reference cell.

4. The method of claim 1, wherein, subsequent to acquiring the joint correction group, the method further comprises, receiving a respective compensation value of self-correction reported after the self-correction by each of the cells to be corrected;

the first parameter comprises a signal parameter of the reference channel and a signal parameter of the non-reference channel, and the calculation of the first correction value of the non-reference channel according to the first parameter is performed by:

$$y_1 = \frac{x^{1 \to 2}}{x^{2 \to 1}} \cdot \frac{w_{AC_1}}{u_1}$$

wherein, $y_1$ is the first correction value, $x^{1 \to 2}$ is the signal parameter of the reference channel, $x^{2 \to 1}$ is the signal parameter of the non-reference channel, and $W_{AC_1}$ is the compensation value of the self-correction corresponding to the reference channel; and in response to a completion of self-correction of both of the reference channel and the non-reference channel, $u_1 = W_{AC_2}$; and in response to a completion of the self-correction of the reference channel and an incompletion of the self-correction of the non-reference channel, $u_1 = 1$, and $W_{AC_2}$ is the compensation value of the self-correction corresponding to the non-reference channel.

5. The method of claim 1, wherein the first parameter comprises a signal parameter of the reference channel and a signal parameter of the non-reference channel, and the calculation of the first correction value of the non-reference channel according to the first parameter is performed by:

$$y_1 = \frac{x^{1 \to 2}}{x^{2 \to 1}}$$

wherein, $y_1$ is the first correction value, $x^{1 \to 2}$ is the signal parameter of the reference channel, and $x^{2 \to 1}$ is the signal parameter of the non-reference channel.

6. The method of claim 1, further comprising, performing a determination as to whether a successful mutual correction of each non-reference with the reference cell is present, according to the correction record table, and identifying all cells with failed mutual correction and all cells with successful mutual correction;

selecting a relay cell from the cells with successful mutual correction, and selecting a relay channel corresponding to the relay cell;

acquiring a second parameter during the transmission and reception, reported after mutual transmissions of the correction sequences between the relay channel and corresponding channel of each cell with failed mutual correction, and the first correction value of the relay channel;

calculating a second correction value of a channel with failed correction, according to the second parameter and the first correction value, wherein the channel with failed correction is a channel corresponding to the cell with failed mutual correction; and sending the second correction value to a respective non-reference channel for correction.

7. The method of claim 6, wherein selecting the relay cell from the cells with successful mutual correction, and selecting the relay channel corresponding to the relay cell, comprises:

selecting the relay cell from the cells with successful mutual correction for each cell with failed mutual correction according to the correction record table; and selecting a channel with a greatest signal-to-noise ratio of transmission and reception on a radio remote unit (RRU) corresponding to the relay cell, as the relay channel.

8. The method according to claim 6, wherein, in response to a reception of a compensation value of self-correction reported by the cell to be corrected after self-correction is performed subsequent to acquiring the joint correction group, the second parameter comprises a signal parameter of the relay channel and a signal parameter of a channel with failed correction, and the calculation of the second correction value of the cell with failed correction according to the second parameter and the first correction value is performed by:

$$y_2 = \frac{x^{3 \to 4}}{x^{4 \to 3}} \cdot \frac{w_{AC_3}}{u_2} \cdot y_1,$$

wherein, $y_2$ is the second correction value, $y_1$ is the first correction value of the relay channel, $x^{3 \to 4}$ is the signal parameter of the relay channel, $x^{4 \to 3}$ is the signal parameter of the channel with failed correction, and $W_{AC_3}$ is the compensation value of the self-correction of the relay channel, and in response to a completion of the self-correction of the relay channel and an incompletion of the self-correction of the channel with failed correction, $u_2 = 1$, and $W_{AC_4}$ is the compensation value of the self-correction of the channel with failed correction.

9. The method of claim 6, wherein the second parameter comprises a signal parameter of the relay channel and a signal parameter of a channel with failed correction, and the calculation of the second correction value of the channel with failed mutual correction according to the second parameter and the first correction value is performed by:

$$y_2 = \frac{x^{3 \to 4}}{x^{4 \to 3}} \cdot y_1,$$

wherein, $y_2$ is the second correction value, $y_1$ is the first correction value of the relay channel, $x^{3 \to 4}$ is the signal parameter of the relay channel, and $x^{4 \to 3}$ is the signal parameter of the channel with failed correction.

10. The method of claim 2, further comprising, performing a determination as to whether a successful mutual correction of each non-reference with the reference cell is present, according to the correction record table, and identifying all cells with failed mutual correction and all cells with successful mutual correction;
selecting a relay cell from the cells with successful mutual correction, and selecting a relay channel corresponding to the relay cell;
acquiring a second parameter during the transmission and reception, reported after mutual transmissions of the correction sequences between the relay channel and corresponding channel of each cell with failed mutual correction, and the first correction value of the relay channel;
calculating a second correction value of a channel with failed correction, according to the second parameter and the first correction value, wherein the channel with failed correction is a channel corresponding to the cell with failed mutual correction; and
sending the second correction value to a respective non-reference channel for correction.

11. The method of claim 3, further comprising,
performing a determination as to whether a successful mutual correction of each non-reference with the reference cell is present, according to the correction record table, and identifying all cells with failed mutual correction and all cells with successful mutual correction;
selecting a relay cell from the cells with successful mutual correction, and selecting a relay channel corresponding to the relay cell;
acquiring a second parameter during the transmission and reception, reported after mutual transmissions of the correction sequences between the relay channel and corresponding channel of each cell with failed mutual correction, and the first correction value of the relay channel;
calculating a second correction value of a channel with failed correction, according to the second parameter and the first correction value, wherein the channel with failed correction is a channel corresponding to the cell with failed mutual correction; and
sending the second correction value to a respective non-reference channel for correction.

12. The method of claim 4, further comprising,
performing a determination as to whether a successful mutual correction of each non-reference with the reference cell is present, according to the correction record table, and identifying all cells with failed mutual correction and all cells with successful mutual correction;
selecting a relay cell from the cells with successful mutual correction, and selecting a relay channel corresponding to the relay cell;
acquiring a second parameter during the transmission and reception, reported after mutual transmissions of the correction sequences between the relay channel and corresponding channel of each cell with failed mutual correction, and the first correction value of the relay channel;
calculating a second correction value of a channel with failed correction, according to the second parameter and the first correction value, wherein the channel with failed correction is a channel corresponding to the cell with failed mutual correction; and
sending the second correction value to a respective non-reference channel for correction.

13. The method of claim 5, further comprising,
performing a determination as to whether a successful mutual correction of each non-reference with the reference cell is present, according to the correction record table, and identifying all cells with failed mutual correction and all cells with successful mutual correction;
selecting a relay cell from the cells with successful mutual correction, and selecting a relay channel corresponding to the relay cell;
acquiring a second parameter during the transmission and reception, reported after mutual transmissions of the correction sequences between the relay channel and corresponding channel of each cell with failed mutual correction, and the first correction value of the relay channel;
calculating a second correction value of a channel with failed correction, according to the second parameter and the first correction value, wherein the channel with failed correction is a channel corresponding to the cell with failed mutual correction; and
sending the second correction value to a respective non-reference channel for correction.

14. An electronic device comprising,
at least one processor; and,
a memory in communication with the at least one processor; wherein,
the memory stores an instruction executable by the at least one processor which, when are executed by the at least one processor, causes the at least one processor to carry out a method for correcting a cell antenna, comprising,
acquiring a joint correction group, wherein the joint correction group is a set of cells to be corrected;
receiving correction parameters reported after mutual transmissions of correction sequences at several different frequencies by the cells to be corrected, and updating the correction parameters to a correction record table;
selecting a reference cell from the joint correction group, and selecting a reference channel corresponding to the reference cell, according to the correction record table;
acquiring a first parameter during transmission and reception of the correction sequences, reported after mutual transmissions of the correction sequences between the reference channel and a non-reference channel, and calculating a first correction value of the non-reference channel according to the first parameter; and
sending the first correction value to the corresponding non-reference channel for correction, such that antenna corrections on the set of cells to be corrected in the joint correction group are performed simultaneously.

15. The electronic device of claim 14, wherein acquiring the joint correction group, comprises,
acquiring a list of Coordinated Multiple Points (COMP) cells and a cooperative neighbor relationship between the cells;
removing each cell that is not enabled for mutual correction from the list of COMP cells according to a preset filtering rule, and acquiring a list of the cells to be corrected; and
acquiring n joint correction groups according to the list of cells to be corrected and the cooperative neighborhood relationship between the cells, where n is a quantity of cells in the list of the cells to be corrected; wherein, the joint correction group is a set of each determined cell to be corrected in the list of cells to be corrected, and rest of the cells having cooperative neighborhood relationship with the respective determined cell.

16. The electronic device of claim 14, wherein selecting the reference cell from the joint correction group, and selecting the reference channel corresponding to the reference cell, according to the correction record table, comprises, counting a quantity of successful mutual corrections of the cells to be corrected in the joint correction group, according to the correction record table, wherein a successful mutual correction comprises: each of two cells to be corrected successfully receives a correction sequence sent by the other one of the two cells, and a respective correction parameter in the correction record table meets a preset first threshold;

selecting a reference radio remote unit (RRU), according to a quantity of the successful mutual corrections;

selecting a cell to be corrected having a likelihood of successful mutual correction greater than a preset second threshold, from the cells to be corrected corresponding to the reference RRU, as one of at least one reference cell to be confirmed;

selecting a reference cell from the at least one reference cell to be confirmed according to a preset reference cell determination criteria for reference cell; and selecting a channel with a greatest signal-to-noise ratio of transmission and reception from the RRU corresponding to the selected reference cell, as the reference channel, in response to the presence of the reference cell.

17. A non-transitory computer-readable storage medium storing at least one computer program which, when executed by a processor, causes the processor to carry out a method for correcting a cell antenna, comprising, acquiring a joint correction group, wherein the joint correction group is a set of cells to be corrected;

receiving correction parameters reported after mutual transmissions of correction sequences at several different frequencies by the cells to be corrected, and updating the correction parameters to a correction record table;

selecting a reference cell from the joint correction group, and selecting a reference channel corresponding to the reference cell, according to the correction record table;

acquiring a first parameter during transmission and reception of the correction sequences, reported after mutual transmissions of the correction sequences between the reference channel and a non-reference channel, and calculating a first correction value of the non-reference channel according to the first parameter; and sending the first correction value to the corresponding non-reference channel for correction, such that, antenna corrections on the set of cells to be corrected in the joint correction group are performed simultaneously.

18. The non-transitory computer-readable storage medium of claim 17, wherein acquiring the joint correction group, comprises, acquiring a list of Coordinated Multiple Points (COMP) cells and a cooperative neighbor relationship between the cells;

removing each cell that is not enabled for mutual correction from the list of COMP cells according to a preset filtering rule, and acquiring a list of the cells to be corrected; and acquiring n joint correction groups according to the list of cells to be corrected and the cooperative neighborhood relationship, where n is a quantity of cells in the list of the cells to be corrected; wherein, the joint correction group is a set of each determined cell to be corrected in the list of cells to be corrected, and rest of the cells having cooperative neighborhood relationship with the respective determined cell.

19. The non-transitory computer-readable storage medium of claim 17, wherein selecting the reference cell from the joint correction group, and selecting the reference channel corresponding to the reference cell, according to the correction record table, comprises, counting a quantity of successful mutual corrections of the cells to be corrected in the joint correction group, according to the correction record table, wherein a successful mutual correction comprises: each of two cells to be corrected successfully receives a correction sequence sent by the other one of the two cells, and a respective correction parameter in the correction record table meets a preset first threshold;

selecting a reference radio remote unit (RRU), according to a quantity of the successful mutual corrections;

selecting a cell to be corrected having a likelihood of successful mutual correction greater than a preset second threshold, from the cells to be corrected corresponding to the reference RRU, as one of at least one reference cell to be confirmed;

selecting the reference cell from the at least one reference cell to be confirmed according to a preset reference cell determination criteria for reference cell; and selecting a channel with a greatest signal-to-noise ratio of transmission and reception from the RRU corresponding to the selected reference cell, as the reference channel, in response to the presence of the selected reference cell.

* * * * *

UNITED STATES PATENT AND TRADEMARK OFFICE
CERTIFICATE OF CORRECTION

PATENT NO. : 12,231,179 B2  
APPLICATION NO. : 18/029035  
DATED : February 18, 2025  
INVENTOR(S) : Yan Hui et al.

Page 1 of 3

It is certified that error appears in the above-identified patent and that said Letters Patent is hereby corrected as shown below:

On the Title Page

In item (57) - ABSTRACT: Please delete
"A method for correcting antennas in a cell, an electronic device, and a storage medium. A method for correcting antennas in a cell comprises: acquiring a joint correction group, the joint correction group being a set of cells to be corrected (101); receiving correction parameters reported by the cells to be corrected after transmitting correction sequences to each other at several different frequencies, and updating the correction parameters to a correction record table (102); according to the correction record table, selecting, from the joint correction group, a reference cell and a reference channel corresponding to the reference cell (103); acquiring a first parameter, in a transceiving process, reported by the reference channel and a non-reference channel after transmitting the correction sequence to each other, and calculating a first correction value of the non-reference channel according to the first parameter (104); and issuing the first correction value to the corresponding non-reference channel for correction of the non-reference channel (105)." and insert
-- A method for correcting antennas in a cell, an electronic device, and a storage medium are disclosed. The method may include, acquiring a joint correction group, wherein the joint correction group is a set of cells to be corrected; receiving correction parameters reported after mutual transmissions of correction sequences at several different frequencies by the cells to be corrected, and updating the correction parameters to a correction record table; selecting a reference cell from the joint correction group, and selecting a reference channel corresponding to the reference cell, according to the correction record table; acquiring, a first parameter during transmission and reception of correction sequences, reported after mutual transmissions of the correction sequences between the reference channel and a non-reference channel, and calculating a first correction value of the non-reference channel according to the first parameter; and sending the first correction value to the corresponding non-reference channel for correction. --

In the Claims

In Claim 2, Column 14, Line 39, please delete "(COMP)" and insert -- (CoMP) --

Signed and Sealed this  
Eighth Day of April, 2025

Coke Morgan Stewart  
*Acting Director of the United States Patent and Trademark Office*

CERTIFICATE OF CORRECTION (continued)
U.S. Pat. No. 12,231,179 B2

In Claim 2, Column 14, Line 43, please delete "COMP" and insert -- CoMP --

In Claim 4, at Column 15, Lines 30-41, please delete
"wherein, y₁ is the first correction value, x$^{1\rightarrow2}$ is the signal parameter of the reference channel, x$^{1\rightarrow2}$ is the signal parameter of the non-reference channel, and $w_{AC_1}$ is the compensation value of the self-correction corresponding to the reference channel; and in response to a completion of self-correction of both of the reference channel and the non-reference channel, $u_1 = w_{AC_2}$; and in response to a completion of the self-correction of the reference channel and an incompletion of the self-correction of the non-reference channel, u₁=1, and $w_{AC_2}$ is the compensation value of the self-correction corresponding to the non-reference channel." and insert
-- wherein, $y_1$ is the first correction value, $x^{1\rightarrow2}$ is the signal parameter of the reference channel, $x^{2\rightarrow1}$ is the signal parameter of the non-reference channel, and $w_{AC_1}$ is the compensation value of the self-correction corresponding to the reference channel; and in response to a completion of self-correction of both of the reference channel and the non-reference channel, $u_1 = w_{AC_2}$; and in response to a completion of the self-correction of the reference channel and an incompletion of the self-correction of the non-reference channel, $u_1 = 1$, and $w_{AC_2}$ is the compensation value of the self-correction corresponding to the non-reference channel. --

In Claim 5, at Column 15, Lines 53-55, please delete
"wherein, y₁ is the first correction value, x$^{1\rightarrow2}$ is the signal parameter of the reference channel, and x$^{1\rightarrow2}$ is the signal parameter of the non-reference channel." and insert
-- wherein, $y_1$ is the first correction value, $x^{1\rightarrow2}$ is the signal parameter of the reference channel, and $x^{2\rightarrow1}$ is the signal parameter of the non-reference channel.0 --

In Claim 8, at Column 16, Lines 38-48, please delete
"wherein, y₂ is the second correction value, y₁ is the first correction value of the relay channel, x$^{3\rightarrow4}$ is the signal parameter of the relay channel, x$^{4\rightarrow3}$ is the signal parameter of the channel with failed correction, and $w_{AC_3}$ is the compensation value of the self-correction of the relay channel, and in response to a completion of the self-correction of the relay channel and an incompletion of the self-correction of the channel with failed correction, u₂= 1, and $w_{AC_4}$ is the compensation value of the self-correction of the channel with failed correction." and insert
-- wherein, $y_2$ is the second correction value, $y_1$ is the first correction value of the relay channel, $x^{3\rightarrow4}$ is the signal parameter of the relay channel, $x^{4\rightarrow3}$ is the signal parameter of the channel with failed correction, and $w_{AC_3}$ is the compensation value of the self-correction of the relay channel, and in response to a completion of the self-correction of the relay channel and an incompletion of the self-correction of the channel with failed correction, $u_2 = 1$, and $w_{AC_4}$ is the compensation value of the self-correction of the channel with failed correction. --

In Claim 9, at Column 16, Lines 60-63, please delete
"wherein, y₂ is the second correction value, y₁ is the first correction value of the relay channel, x$^{3\rightarrow4}$ is the signal parameter of the relay channel, and x$^{4\rightarrow3}$ is the signal parameter of the channel with failed correction." and insert

CERTIFICATE OF CORRECTION (continued)
U.S. Pat. No. 12,231,179 B2

-- wherein, $y_2$ is the second correction value, $y_1$ is the first correction value of the relay channel, $x^{3\to4}$ is the signal parameter of the relay channel, and $x^{4\to3}$ is the signal parameter of the channel with failed correction. --

In Claim 15, Column 18, Line 51, please delete "(COMP)" and insert -- (CoMP) --

In Claim 15, Column 18, Line 55, please delete "COMP" and insert -- CoMP --

In Claim 18, Column 20, Line 7, please delete "(COMP)" and insert -- (CoMP) --

In Claim 18, Column 20, Line 11, please delete "COMP" and insert -- CoMP --